Figure 1:
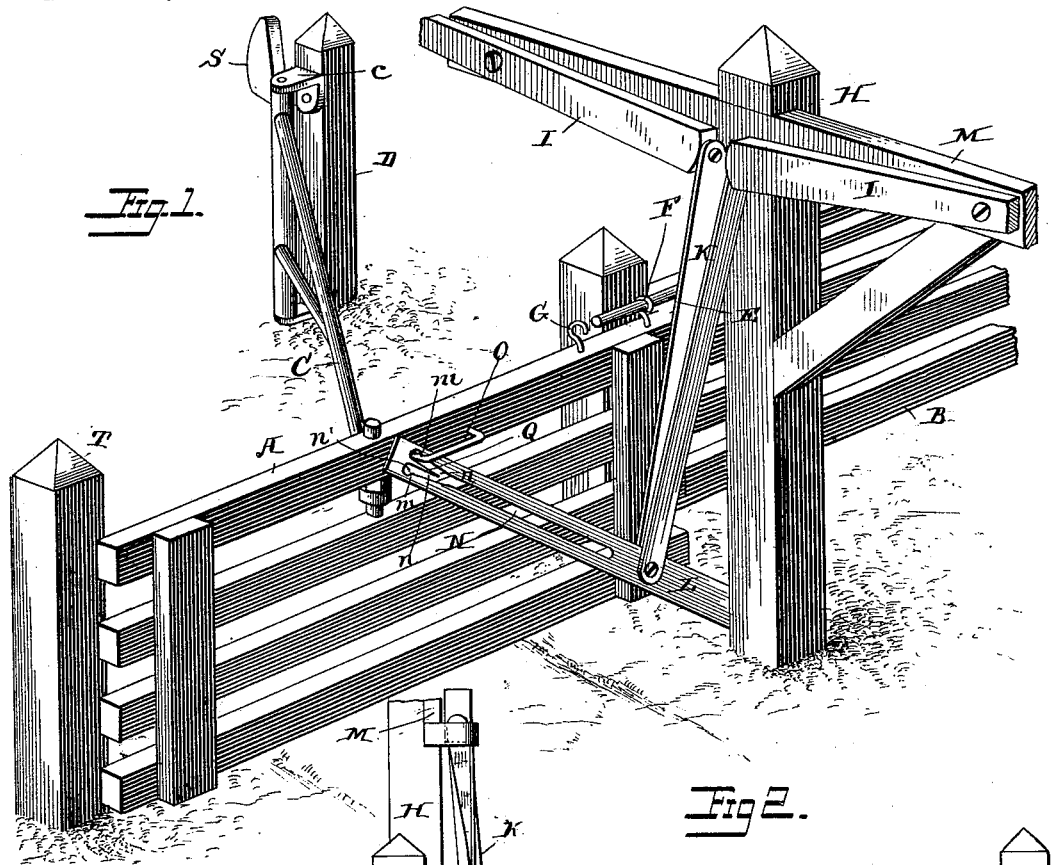

(No Model.)

W. R. WHITE.
GATE.

No. 403,975. Patented May 28, 1889.

Witnesses
Jno. G. Hinkel Jr.
J. S. Barker

Inventor,
William R. White
Foster Freeman
Attorneys.

UNITED STATES PATENT OFFICE.

WILLIAM RICHARD WHITE, OF NEOGA, ILLINOIS.

GATE.

SPECIFICATION forming part of Letters Patent No. 403,975, dated May 28, 1889.

Application filed May 8, 1888. Serial No. 273,188. (No model.)

*To all whom it may concern:*

Be it known that I, WILLIAM RICHARD WHITE, a citizen of the United States, residing at Neoga, Cumberland county, Illinois, have invented certain new and useful Improvements in Gates, of which the following is a specification.

This invention relates to that class of gates which are closed and opened by a longitudinal movement to and from a gate-post; and it consists of a gate supported from a horizontally-swinging arm, in combination with means for properly guiding the gate during the swinging movements of the said arm; and, further, of a novel gate lock or latch, all of which will be fully hereinafter set forth, and are illustrated in the drawings, wherein—

Figure 2:
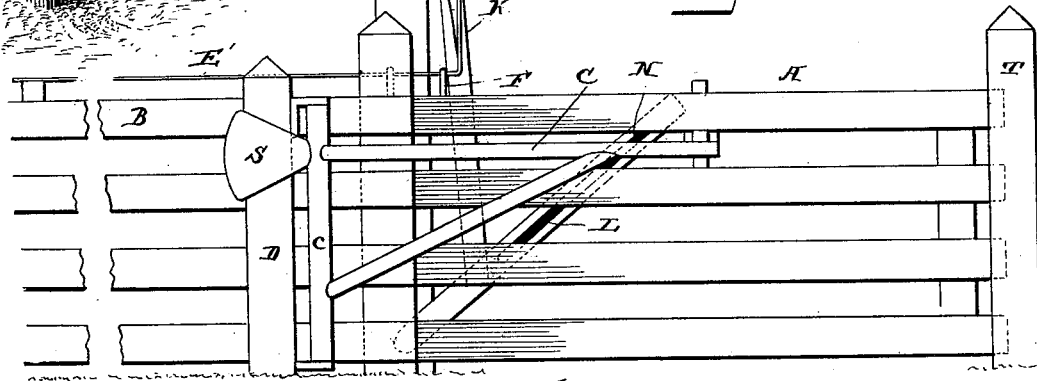
Figure 3:
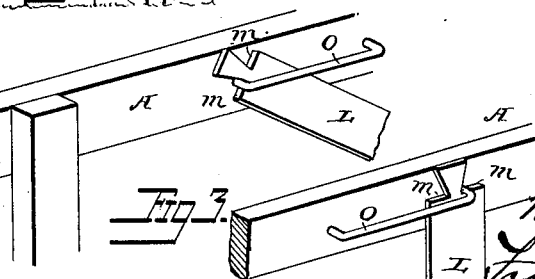

Figure 1 is a perspective view of a gate having my improvements applied thereto. Fig. 2 is a side view of the gate without the opening and closing devices and the latch, and showing a style of guide different from that in Fig. 1. Fig. 3 is a detached perspective view showing a different form of the gate-moving lever and the lock carried thereby.

A represents the gate-panel, of any suitable construction, adapted to be swung across a gateway to and from a post, T, in substantial line with the fence B.

The gate is supported and substantially balanced at the outer or free end of an arm, C, swinging upon a vertical axis, $c$. When the gate is heavy, I prefer to employ a counter-balance, S, on the side of the axis $c$, opposite the gate, as the gate is better balanced thereby and is operated more easily. This arm projects laterally from a post, D, situated at a suitable distance from the gateway, in which the axis of the arm is journaled. The gate may be suspended from the arm in any well-known way; but there should be a pivotal connection thereof with the arm and a guide which operates to prevent the gate from turning too far upon such pivot. This guide may be of many forms. In another application filed by me February 2, 1888, Serial No. 262,756, I have shown such guide as consisting of a pivoted arm parallel with the supporting-arm C and operating either conjointly therewith to support the gate, or merely to preserve the parallelism of the gate, and hence I do not deem it necessary herein to show such construction. In Fig. 1 this guide is shown as consisting of a rod, E, preferably pivoted to the fence and having its free end passing loosely through an eye, F, upon the rear end of the gate. To prevent too great lateral swaying of this rod where pivoted, which would interfere with its guiding effect, stops G G may be carried either by the gate or by the fence, one being shown in the drawings, and that being the form of an eye or loop carried by the gate. Instead of pivoting or hinging the rod E to the fence it may be pivoted to the gate and pass loosely through an eye arranged upon the fence.

In place of a rod, E, such as has just been described, I may use as a guide a wire or cord, E', stretched in line with the fence, and with which engages an eye, F, carried by the gate, as shown in Fig. 2.

It will of course be understood that the guide which directs the movements of the gate may be connected to another support than the fence in such relation thereto as to properly guide the gate; but the advantage of supporting the guide upon the fence will be apparent.

I prefer to arrange the guide high—that is, on a level with or above the top of the fence— in order that deep snow shall not interfere with its operations.

Such gate may be used without operating or shifting levers or handles, although when arranged beside roadways I prefer to provide it with devices so arranged that a person may both open and close the gate without having to leave the vehicle. One form of such device is illustrated in my present application, and in various patents which have heretofore been granted to me are shown forms of opening and closing devices applied to rolling gates, but which are equally applicable to gates of the character herein shown.

Various forms of latches or locks may be used with this gate; but I prefer to employ a lock so connected with the operating-levers that when they are moved to open the gate the lock shall be simultaneously moved to release the gate. Such a construction is shown in another application of mine, filed October 12, 1887, Serial No. 252,173. The construction, however, which I prefer to employ is that shown in Fig. 1, referring to which, H represents a post situated to one side of the gate and carrying a cross-bar, M, upon which are pivoted and supported the operating-levers I. These are connected by a double link, K, with the gate-shifting lever L, pivoted to the post H, and having a sliding connection with the gate near the upper central portion of the latter. This lever lies loosely against a guide, (shown in the form of a staple, O,) against which it is caused to bear in alternate directions to open and close the gate, and it is so arranged as to swing to opposite sides of its pivot to effect each completed movement of the gate, so that it shifts from an inclined position on one side of its pivot to an inclined position on the opposite side thereof each time it opens or closes the gate. This lever in this instance also serves as the latch or lock for the gate for securing it in either an open or a closed position, and for this purpose is provided near its end with two shoulders, $m$, which alternately engage with the guide, and thereby lock the gate in its extreme open and closed positions.

In the construction shown in Fig. 1, the lever L is slotted at N to permit it to slide over the guide O. This slot at its upper end forks, forming two slots, $n\ n$, separated by a narrow tongue, Q, and which are at their ends expanded to form the shoulders $m$.

When the gate is at the central position of its movement, the lever L occupies a vertical position; but when the gate passes to either side thereof, the gravity of the lever causes it to fall, so that the upper edge of the slot N rests upon and is supported by the guide O, which insures that it shall take the upper of the two slots $n$, and be guided thereby into the expanded seat $n'$ and in contact with the shoulder $m$. The first movement on operating the lever L to open or close the gate disengages the shoulder $m$ from the guide O, when a continued upward movement of the lever will swing the gate to its opposite position, as will be understood without further description.

In Fig. 3 I have illustrated the lever L as provided with a lock of a slightly different construction from that shown in Fig. 1. Instead of slotting the lever, in this case the shoulders $m$ are external and engage with the guide O in its different positions of the lever and lock the gate as before. This style of gate-lock may be used in connection with the ordinary gate sliding on rollers, and hence I do not wish to be limited to its use in connection with the style of gate shown herein. It is also obvious that it may be used in connection with opening-handles adapted to be operated by pedestrians from the ground.

I do not herein claim a gate supported at the end of one or more horizontally-swinging arms, as I have made this invention the subject-matter of said application, Serial No. 262,756, filed February 2, 1888.

I am aware that sliding gates supported upon rollers have been moved endwise by means of levers pivoted below the gates and having their free ends slotted to engage with pins carried by the gate, and hence I do not claim such combination.

Without limiting myself to the precise construction and arrangement of parts shown, I claim—

1. A gate suspended from the outer end of a horizontal swinging arm, constituting the sole support of the gate, in combination with a guide to maintain the gate in line with the gate-posts during its swinging movements, substantially as described.

2. A gate arranged in substantial line with a fence pivotally suspended from a horizontal swinging arm, in combination with a guide supported at one end by the gate and at the other by the fence, and arranged to direct the position of the gate on its pivot during its swinging movements, substantially as described.

3. A gate pivotally suspended from a horizontal swinging arm, in combination with a pivoted guide-rod, E, an eye through which it slides, and stops to limit the lateral movements of the rod, substantially as described.

4. In combination with a gate having an endwise movement, a lever pivoted to one side of the gate and its free end engaging with a guide on the gate, said lever being provided with locking-shoulders to lock the gate in its open and closed positions, substantially as described.

5. In combination with a gate having an endwise movement, a gravitating lever pivoted at one side of the gate and engaging with a guide on the gate and having opposed shoulders $m\ m$, which respectively lock the gate in its open and its closed positions, substantially as described.

6. In combination with a gate having an endwise movement, a gravitating lever pivoted at one side of the gate and engaging with a guide on the gate and having opposed shoulders $m\ m$, which respectively lock the gate in its open and its closed positions, and an operating-handle adapted to lift the lever to unlock and to move the gate, substantially as described.

7. In combination with a gate having an endwise movement, a gravitating lever, L, pivoted at one side of the gate and slotted at its upper end to engage with a guide carried by the gate, the slot being at its upper end divided by a tongue, Q, and terminating in seats $n'$, and an operating-lever for moving the lever L, substantially as described.

8. In combination with a gate having an endwise movement, a lever pivoted to one side of the gate and having its free end provided with a locking-shoulder adapted to engage with a guide carried by the gate, whereby the gate is locked, substantially as described.

In testimony whereof I have signed my name to this specification in the presence of two subscribing witnesses.

WILLIAM RICHARD WHITE.

Witnesses:
FAIRELENDER WHITE,
MATTIE WHITE.